United States Patent [19]
Kori et al.

[11] Patent Number: 5,126,847
[45] Date of Patent: Jun. 30, 1992

[54] APPARATUS FOR PRODUCING A COMPOSITE SIGNAL FROM REAL MOVING PICTURE AND STILL PICTURE VIDEO SIGNALS

[75] Inventors: Teruhiko Kori, Tokyo; Koji Iijima, Kanagawa; Takao Takahashi; Kazuo Yoshino, both of Tokyo; Masaaki Kojima, Kanagawa, all of Japan

[73] Assignee: Sony Corporation, Tokyo, Japan

[21] Appl. No.: 587,988

[22] Filed: Sep. 25, 1990

[30] Foreign Application Priority Data

Sep. 28, 1989 [JP] Japan .................. 1-253667

[51] Int. Cl.⁵ .................................. H04N 5/262
[52] U.S. Cl. ......................... 358/183; 358/181
[58] Field of Search ............. 358/183, 229 IP, 336, 358/314, 182, 16 T, 36, 181

[56] References Cited

U.S. PATENT DOCUMENTS

| | | | |
|---|---|---|---|
| 4,249,122 | 2/1981 | Ito et al. | 358/183 |
| 4,667,221 | 5/1987 | Cawley et al. | 358/183 |
| 4,679,086 | 7/1987 | May | 358/167 |
| 4,686,838 | 8/1987 | Tomita et al. | 358/336 |
| 4,730,260 | 3/1988 | Mori et al. | 358/183 |
| 4,737,850 | 4/1988 | Lu et al. | 358/36 |
| 4,777,531 | 10/1988 | Hakamada et al. | 358/183 |
| 4,796,089 | 1/1989 | Imai et al. | 358/22 |
| 4,841,366 | 6/1989 | Katagiri et al. | 358/167 |
| 4,862,269 | 8/1989 | Sonoda et al. | 358/22 |
| 4,872,066 | 10/1989 | Yamagata et al. | 358/336 |
| 4,891,699 | 1/1990 | Hamada et al. | 358/214 |
| 4,905,077 | 2/1990 | Ishii | 358/22 |
| 4,935,815 | 6/1990 | Ichikawa et al. | 358/183 |
| 5,003,404 | 3/1991 | Yoshimura et al. | 358/182 |
| 5,043,815 | 8/1991 | Yoshimura et al. | 358/167 |
| 5,055,920 | 10/1991 | Illetschke | 358/167 |

FOREIGN PATENT DOCUMENTS

0152373 6/1990 Japan .

Primary Examiner—James J. Groody
Assistant Examiner—Jeffrey S. Murrell
Attorney, Agent, or Firm—Alvin Sinderbrand; William S. Frommer

[57] ABSTRACT

A video signal processing apparatus has an input terminal receiving a real moving picture video signal, for example, from a video camera, a memory for storing at least one field of the real moving picture video signal so as to form a still picture video signal, a key signal generator which may be constituted by an additional memory storing data characteristic of a key picture, and a circuit responsive to reading of the data stored in the additional memory for switching between the real moving picture video signal and the still picture video signal and thereby forming a composite video signal therefrom.

7 Claims, 4 Drawing Sheets

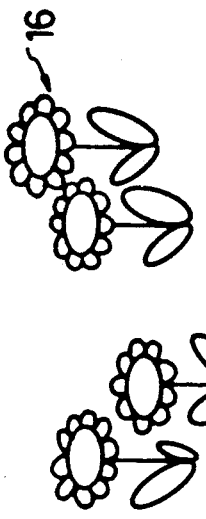
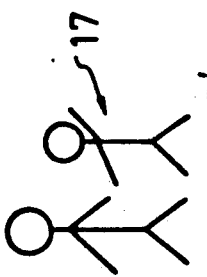
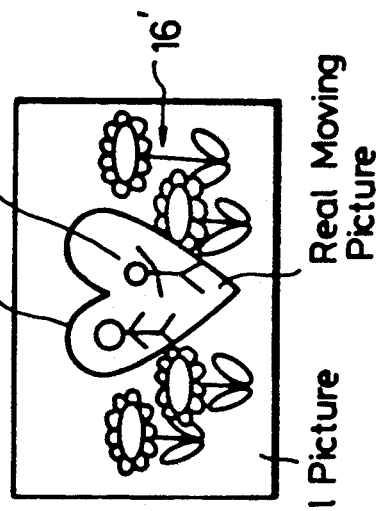
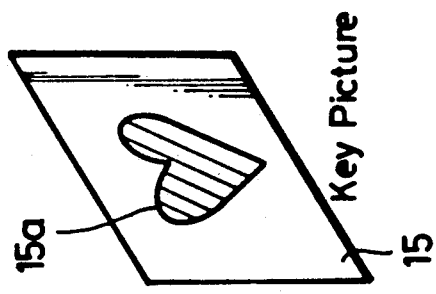

APPARATUS FOR PRODUCING A COMPOSITE SIGNAL FROM REAL MOVING PICTURE AND STILL PICTURE VIDEO SIGNALS

BACKGROUND OF THE INVENTION

1. Field of the Invention

The present invention relates generally to video signal processing apparatus and, more particularly, is directed to a video signal processing apparatus adapted for incorporation in a home video camera.

2. Description of the Prior Art

In a known home video camera, a binary value signal, for example, representing characters, indicia and the like to be used in creating a title, is generated in advance and converted into a color signal which is mixed or composed with a real moving picture video signal so as to provide a composite signal that may be displayed as a title picture. In such known home video camera, it is desirable to be able to mix other video signals as well as the generated binary value signal with the real moving picture video signal.

Further, it has been proposed to reduce noise in a video signal by using a so-called field memory, for example, as disclosed in Japanese Patent Published Gazette No. 62-3639. An example of a previously-proposed noise reducing circuit employing a field memory is shown in FIG. 1 in which a video signal Y applied to an input terminal 1 is supplied directly therefrom to an adder 2 having its output signal Y' supplied to an output terminal 3 and also to a field memory 4. Further, a video signal $Y_D$ delayed, for example, one field period, by the field memory 4, is supplied from the latter to one input of a subtractor 5 which, at its other input receives the video signal Y applied to the input terminal 1. Thus, the video signal Y applied to the input terminal 1 is subtracted from the delayed video signal $Y_D$, and the result of such subtraction, that is, $(Y_D-Y)$, is supplied to a coefficient generator 6. The coefficient generator 6 provides, as its output, a signal k $(Y_D-Y)$ in which k is a coefficient provided in the generator 6 and which is selected in response to the magnitude of the difference or output $(Y_D-Y)$ from the 10 subtractor 5. Such output k $(Y_D-Y)$ from the coefficient generator 6 is applied to another input of the adder 2 so that the signal Y' appearing at the output of the adder 2, and hence derived at the output terminal 3, is expressed by the following noise reducing equation:

$$Y' = Y + k(Y_D - Y)$$

or $$Y' = (1-k)Y + kY_D \quad (1)$$

Therefore, noise can be reduced by properly selecting the value of the coefficient k in response to the magnitude of the difference $(Y_D-Y)$ between the signal Y at the input and the delayed signal $Y_D$. More specifically, the value of the coefficient k is selected so as to provide a characteristic substantially as shown on FIG. 2, in which the inclination of the illustrated curve represents the coefficient k. In the characteristic curve shown on FIG. 2, the portion corresponding to a relatively large magnitude of the difference $(Y_D-Y)$ corresponds to a real moving picture and, accordingly, the value of the coefficient k is decreased. On the other hand, a portion of the curve or graph shown on FIG. 2 for a relatively small magnitude of the difference $(Y_D-Y)$ corresponds to a still picture and, accordingly, the coefficient k is then selected to be near 1.0, with the result that the amount of feedback through the field memory 4 is increased for reducing the noise in the output video signal.

In a practical embodiment of the coefficient generator 6, the latter may include, for example, a read only memory (ROM) from which there are derived output data $k(Y_D-Y)$ in response to the application to the ROM of the value $(Y_D-Y)$ as address data therefor. Further, in order to provide for varying the degree of noise reduction, the ROM may have a plurality of data patterns established therein which are selectively addressed.

It will be appreciated that, in the prior art noise reducing circuit described above with reference to FIG. 1, the field memory 4 thereof is used to mix video signals. If a so-called video image memory is employed as the field memory 4, such video image memory is generally arranged to generate data of a lower address from the inside of the memory in order to facilitate generation of address data at the outside of the memory, with data being written and/or read in units of, for example, 60 blocks. For the foregoing reason, if a so-called video image memory is used to mix the video signals in the noise reducing circuit, the signal cannot be readily rewritten in pixel units so that the video signals cannot be conveniently mixed.

OBJECTS AND SUMMARY OF THE INVENTION

Accordingly, it is an object of the present invention to provide an improved video signal processing apparatus which can avoid the above described disadvantages of the prior art.

More specifically, it is an object of the present invention to provide a video signal processing apparatus in which video signals transmitted through a single signal line can be made composite by means of a relatively simple circuit arrangement.

Another object of the present invention is to provide a video signal processing apparatus, as aforesaid, which can also serve as a noise reducing circuit.

Still another object of the present invention is to provide a video signal processing circuit which can also function as a drop-out compensating circuit.

In accordance with an aspect of the present invention, a video signal processing apparatus comprises means, such as an image pick-up device, for providing a real moving picture video signal which is supplied to an input terminal, a memory for storing therein at least one field of the real moving picture video signal so as to form a still picture video signal, means for generating a key signal, and means responsive to such key signal for selectively switching between the real moving picture video signal and the still picture video signal so as to form a mixed video signal supplied to an output terminal.

The above, and other objects, features and advantages of the present invention, will be apparent in the following detailed description of preferred embodiments when read in conjunction with the accompanying drawings, in which the same reference numerals are used to identify corresponding or similar parts in the several views.

BRIEF DESCRIPTION OF THE DRAWINGS

FIG. 3B is a fragmentary schematic block diagram showing another modification of the video signal processing apparatus of FIG. 3;

FIGS. 4A-4D are schematic diagrams to which reference will be made in explaining the operation of the video signal processing apparatus shown in FIG. 3;

DETAILED DESCRIPTION OF PREFERRED EMBODIMENTS

Figure 1:
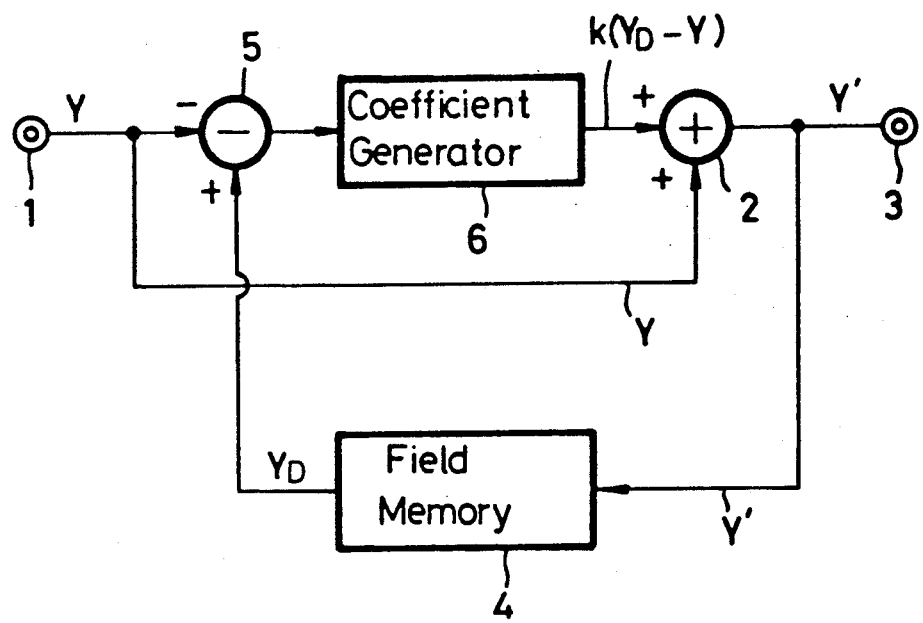
FIG. 1 is a schematic block diagram showing a noise reducing circuit according to the prior art.
Figure 2:
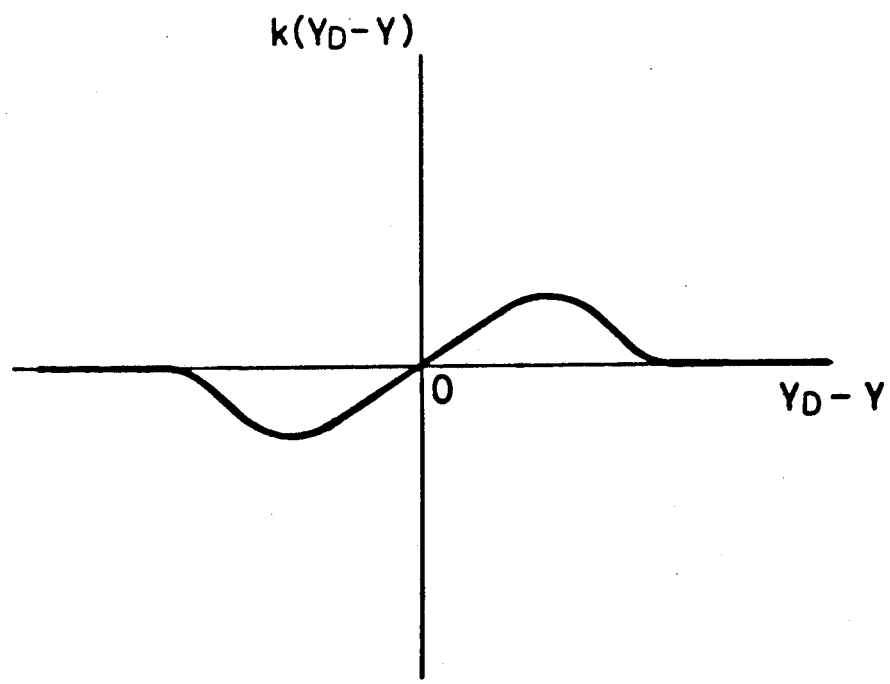
FIG. 2 is a graph illustrating an example of a characteristic of a coefficient generator used in the noise reducing circuit of FIG. 1.
Figure 3:
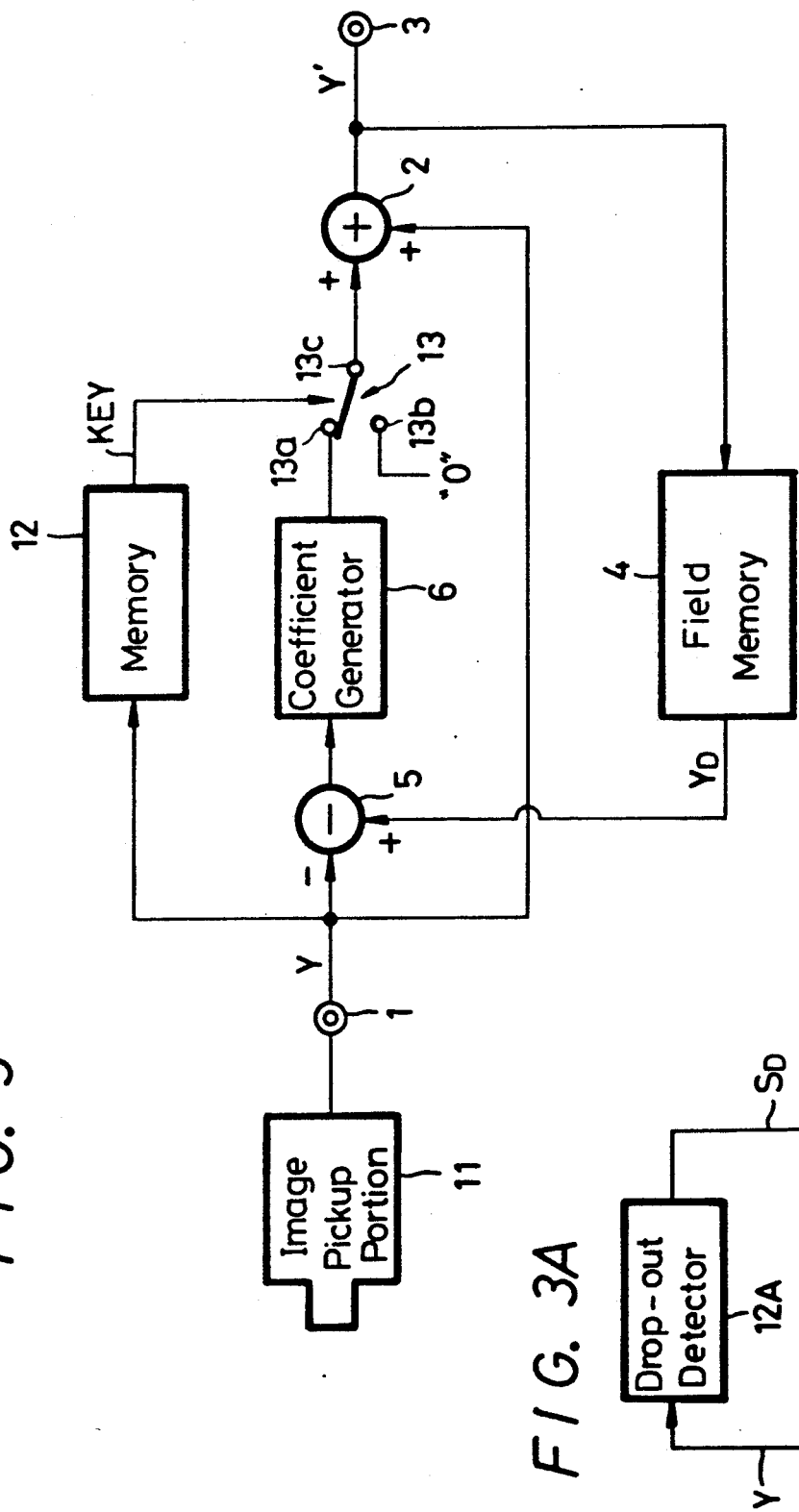
FIG. 3 is a schematic block diagram showing a video signal processing apparatus according to an embodiment of the present invention.

Referring now to FIG. 3, it will be seen that, in a first embodiment of a video signal processing apparatus according to the invention, a noise reducing circuit similar to that described previously with reference to FIG. 1 is utilized and has its several parts identified by the same reference numerals. More specifically, in the embodiment of FIG. 3, an input video signal Y, for example, from an image pick-up portion or element 11 of a video camera 10, is supplied through a single signal line to an input terminal 1 from which, as before, the video signal is supplied directly to respective inputs of an adder 2 and a subtractor 5. However, the video signal applied to the input terminal 1 in FIG. 3 is also supplied to a binary memory 12 having a bit number which corresponds to the number of pixels or picture elements in, for example, one field of a video signal.

As before, the output Y' of the adder 2 is applied to the output terminal 3 and also to the field memory 4, and the output $Y_D$ from the field memory 4 is applied to a respective input of the subtractor 5 which, in turn, has its output $(Y_D - Y)$ applied to a coefficient generator 6. However, in the embodiment of the present invention illustrated on FIG. 3, the output of the coefficient generator 6 is supplied to one fixed contact 13a of a change-over switch 13 which further has a movable contact 13c alternately engageable with the fixed contact 13a or with another fixed contact 13b to which a signal representing the logic value "0" is supplied. The change-over switch 13 is controlled by a key signal KEY read out from the binary memory 12, and the movable contact 13c is connected to a respective input of the adder 2.

Further, in the embodiment of the invention shown on FIG. 3, the coefficient generator 6 is provided with a "throughmode" in which input address data is directly output from generator 6. Thus, when the coefficient generator 6 is in its through-mode, that is, the change-over switch 13 is positioned or conditioned by the key signal KEY to engage its movable contact 13c with the fixed contact 13a, it is the equivalent of providing the coefficient k of the coefficient generator 6 with the logic value "1". In such case, the previously described noise reducing equation (1) can be rewritten as:

$$Y' = Y + k(Y_D - Y) \quad (2)$$
$$Y' = Y + Y_D - Y$$
$$Y' = Y_D$$

Therefore, when the coefficient generator 6 is in its through-mode or the switch 13 engages its fixed contact 13a so that the coefficient k equals "1", the data output from the terminal 3 and contemporaneously written in the field memory 4 corresponds to the data of the preceding field, that is, the data of the preceding field is stored in the field memory 4 and a still picture video signal is output at the terminal 3. On the other hand, when the switch 13 engages its movable contact 13c with the fixed contact 13b, this is the equivalent of providing the coefficient k of the coefficient generator 6 with the value "0". In such case, the noise reducing equation (1) is rewritten as:

$$Y' = Y + k(Y_D - Y) \quad (3)$$
$$Y' = Y$$

Therefore, the data being supplied to the input terminal 1 is contemporaneously outputted at the output terminal 3 and also contemporaneously written in the field memory 4, that is, data stored in the field memory 4 is replaced with new data whenever the switch 13 engages its fixed contact 13b.

It will be appreciated that the switching operation of the change-over switch 13 is controlled in pixel units, that is, pixel-by-pixel, by the key signal KEY read from the memory 12. Thus, for each pixel, the movable contact 13c of the change-over switch 13 engages either the fixed contact 13a corresponding to k = "1", or the fixed contact 13b corresponding to k = "0". At any pixel for which movable contact 13c engages fixed contact 13a, that is, k = "1", the output Y' of the adder 2 is equal to the delayed signal $Y_D$ from the field memory 4 (equation 2), so that the data being read from the memory 4 for the respective pixel is written again in the field memory. On the other hand, at any pixel for which the movable contact 13c of the switch 13 is made to engage the fixed contact 13b, that is, k = "0", the output Y' of the adder 2 is equal to the input video signal Y for that pixel (equation 3). Therefore, only the video signal for the pixel at which the key signal KEY causes the switch 13 to engage its fixed contact 13b is written as new data in the field memory 4. It will be appreciated from the foregoing that, in the video signal processing apparatus embodying the present invention, as shown on FIG. 3, data can be written in pixel units in the field memory 4 irrespective of the writing and/or reading system of such field memory.

The operation of the video signal processing apparatus described above with reference to FIG. 3 will now be described with reference to FIGS. 4A-4D. Initially, and as indicated at 10A on FIG. 4A, the video camera is aimed at a black and white key picture 15 which, for example, defines a heart-shaped area 15a, and the corresponding binary values of the pixels representing the key picture 15 are stored in the memory 12. Then, as indicated at 10B in FIG. 4B, the video camera is directed at a suitable scene, for example, a background of flowers as indicated at 16, while the change-over switch 13 is suitably controlled to continuously engage its movable contact 13c with the fixed contact 13a, with the result that the video image picked up by the video camera in the position 10B is stored as a still picture in the field memory 4. Thereafter, and as indicated at 10C in FIG. 4C, the video camera is employed for providing a real moving picture video signal, for example, of moving figures indicated at 17, while the key signal stored in the memory 12 and corresponding to the key picture 15 is output from the memory 12 and used for controlling the change-over switch 13. As a result of the foregoing, a mixed or composite video signal is obtained at the output terminal 3 for providing a composite video picture, as shown in FIG. 4D, and in which a real moving picture 17' is superimposed, within the heart-shaped area 15'a, upon a still picture 16'.

It will be apparent from the above described operation of the video signal processing apparatus of FIG. 3 that, in accordance with the invention, a still picture video signal stored in the memory 4 and a real moving picture video signal being provided by the video camera 10 are switched or alternated on the basis of the key signal KEY from the memory 12, so that the still and moving picture video signals are composed or multiplexed by a simplified arrangement for transmission through a single signal line from the output terminal 3.

Although the change-over switch 13 is controlled pixel-by-pixel, the field memory 4 may be a video image memory in which the writing and reading are performed in block units.

Further, as shown in FIG. 3B, the coefficient generator 6 and the changeover switch 13 may be constituted by a multiplier 6' and a read only memory (ROM) having data patterns of k="1" and k="0" which are selected in response to the key signal KEY and then employed in the multiplier for multiplying the input signal $(Y_D-Y)$ and providing the output $k(Y_D-Y)$ to the respective input of the adder 2.

Figure 3A:
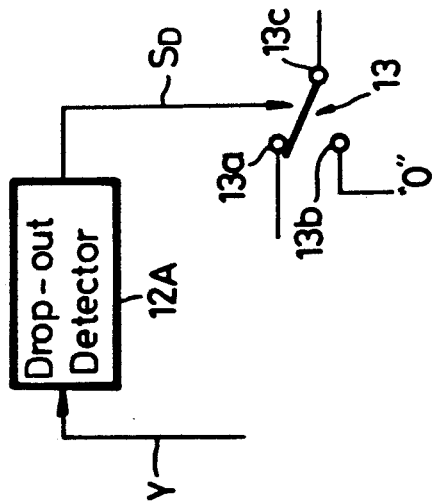
FIG. 3A is a fragmentary schematic block diagram showing a modification of the video signal processing apparatus of FIG. 3.

Furthermore, as shown in FIG. 3A, a drop-out detector 12A for sensing a drop out in the input video signal Y may be employed in place of the memory 12 to provide a drop out detecting signal $S_D$ instead of the key signal KEY for controlling the change-over switch 13. In such case, the described video signal processing apparatus can be used as a drop out compensating circuit in which the movable contact 13c of the switch 13 normally engages its fixed contact 13b to provide at the output terminal 3 an output signal Y' corresponding to the input signal Y. On the other hand, when a drop out is detected, the resulting drop out detecting signal $S_D$ causes the movable contact 13c of the switch 13 to engage the fixed contact 13a with the result that the signal Y' then appearing at the output terminal 3 corresponds to the signal $Y_D$ of the preceding field so as to compensate for the detected drop out.

Figure 5:
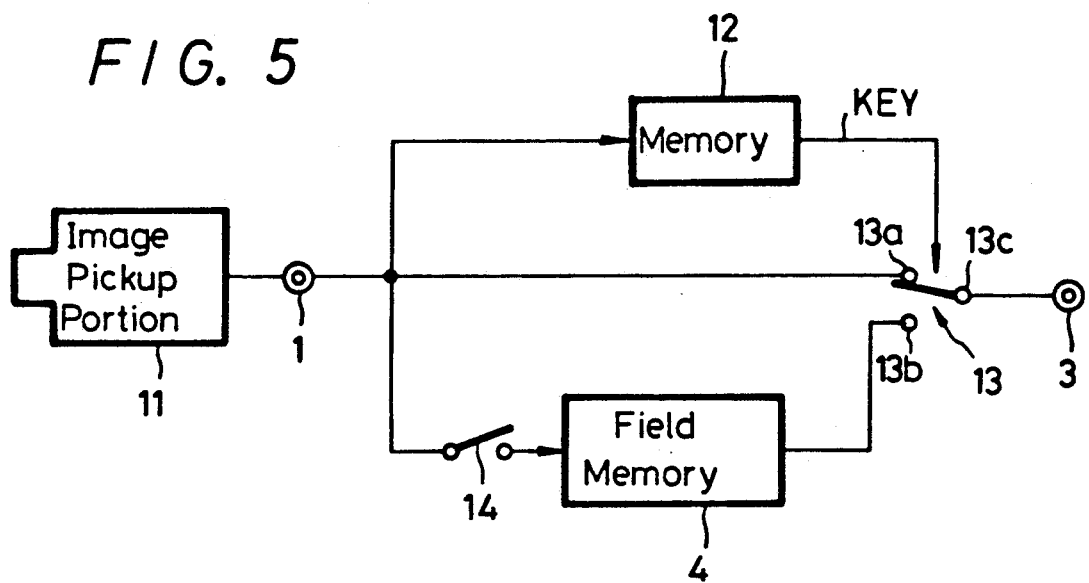
FIG. 5 is a schematic block diagram showing a video signal processing apparatus according to another embodiment of the present invention.

If a video signal processing apparatus embodying this invention does not need to serve as a noise reducing circuit, such apparatus may be arranged as shown in FIG. 5 in which parts corresponding to those described with reference to FIG. 3 are identified by the same reference numerals In the apparatus of FIG. 5, the video signal applied to the input terminal 1 is supplied directly to the fixed contact 13a of the change-over switch 13, and is also supplied through a switch 14 to an input of the field memory 4 which has its output connected to the fixed contact 13b. Further, the movable contact 13c of the switch 13 is connected to the output terminal 3 and the switch 13 is again controllable by a key signal KEY read from the memory 12 which has an input connected with the input terminal 1. Initially, a key picture, for example, a shown in FIG. 4A, is picked by the image pick-up element or portion 11 of a video camera, and a corresponding key picture signal is written in the memory 12. Thereafter, the switch 14 is suitably closed while the video camera is directed at a background scene 16, as at 10B in FIG. 4B, with the result that a corresponding still picture signal is written in the field memory 4. Finally, the switch 13 is controlled by the key signal KEY read out from the memory 12 while a real moving picture is picked up by the image pick-up portion 11 of the video camera, as at 10C in FIG. 4C, with the result that a mixed video signal is obtained at the output terminal 3 for providing a mixed video picture, again as shown in FIG. 4D, and in which a real moving picture 17' is superimposed, within the heart-shaped area 15'a, upon a still picture 16'.

Figure 6A:
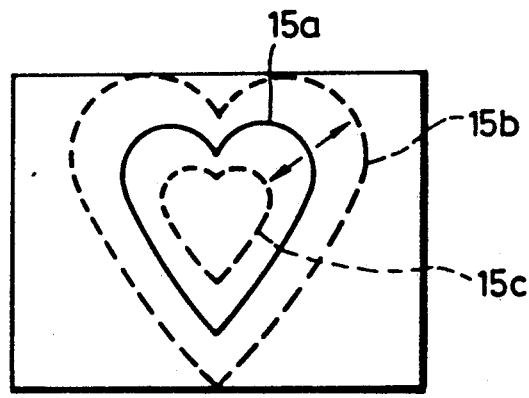
FIGS. 6A-6B are schematic diagrams to which reference will be made in explaining respective wiping effects of a picture on a picture screen.
Figure 6B:
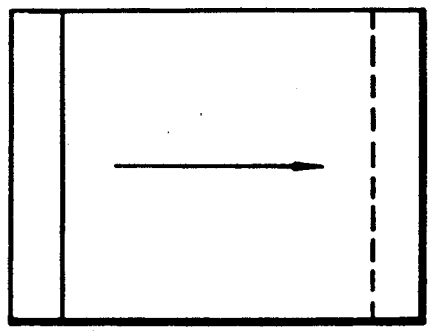

It will be understood that, in the above described apparatus of FIG. 5, the heart-shaped area 15a of the key picture may be increased or reduced in size, for example, as shown in dotted lines at 15b and 15c, respectively, on FIG. 6A, by suitably controlling the read addresses of the memory 12, whereby a so-called wipe effect is achieved. Alternatively, a wipe effect, in which the key picture is moved laterally from left to right as shown in FIG. 6B, or vertically upward or downward, can be similarly achieved by suitably controlling the read addresses of the memory 12. Furthermore, if the key picture is a simple geometric figure, as described above, the memory 12 may be replaced by a suitable key signal generator, such as, a ROM or the like which is addressed for providing the desired key picture signal KEY for controlling the switch 13.

In the embodiments of this invention shown on FIGS. 3 and 5, the input video signal applied to the input terminal 1 has been shown to be derived from the image pick-up portion or element 11 of a video camera 10. However, the video signal processing apparatus embodying the invention may be also incorporated in a video tape recorder (VTR), editing apparatus or the like, in which, for example, the input video signal is derived from a magnetic head or the like which reproduces a video signal recorded on a magnetic tape or other medium.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:
1. A video signal processing apparatus comprising:
a single video input terminal receiving said real moving picture video signal;
memory means for storing therein at least one field of said real moving picture video signal so as to thereby form a still picture video signal;
means for providing a key signal including an additional memory in which there is written data characteristic of a key picture, and said data is repeatedly read from said additional memory as said key signal for controlling said means for selectively switching between said real moving picture video signal and said still picture video signal;
means responsive to said key signal for selectively switching between said real moving picture video signal and said still picture video signal so as to form a composite video signal therefrom; and an output terminal to which said composite video signal is supplied.

2. The apparatus according to claim 1; in which said memory means is a field memory.

3. The apparatus according to claim 1; in which said means for providing a real moving picture video signal includes an image pick-up element of a video camera.

4. The apparatus according to claim 1; in which said memory means includes a field memory and a switch selectively closable for connecting said input terminal to an input of said field memory so as to store said still picture video signal in said field memory; and in which said means for selectively switching includes a change-over switch having first and second inputs connected directly to said input terminal and to an output of said field memory, respectively, and being alternately connected to said output terminal in response to said key signal.

5. A video signal processing apparatus comprising:
means for providing a real moving picture video signal;
an input terminal receiving said real moving picture video signal;
memory means for storing therein at least one field of said real moving picture video signal so as to form a still picture video signal as an output signal from said memory means;
means for providing a key signal;
adding means having a first input receiving said real moving picture video signal from said input terminal, a second input and an output;
subtracting means for subtracting said real moving picture video signal from said output signal of said memory means and providing a respective subtracted output;
means for multiplying said subtracted output by a selected coefficient and providing a multiplied signal to said second input of said adding means;
means responsive to said key signal for selectively switching between said real moving picture video signal and said multiplied signal by establishing the values "0" and "1", respectively, for said selected coefficient and thereby forming, as said output of said adding means, a composite video signal from said still picture video signal and said real moving picture video signal; and
an output terminal to which said composite video signal is supplied.

6. The apparatus according to claim 5; in which said means for multiplying said subtracted output by a selected coefficient includes a read only memory from which said coefficient is selectively read, and multiplier means multiplying said subtracted output by said coefficient read from said read only memory.

7. A video signal processing apparatus comprising:
means for providing a real moving picture video signal;
an input terminal receiving said real moving picture video signal;
memory means for storing therein at least one field of said real moving picture video signal so as to form a still picture video signal;
means for providing a key signal which includes drop-out detecting means for sensing a drop-out in said real moving picture video signal applied to said input terminal;
means responsive to said key signal for selectively switching between said real moving picture video signal and said still picture video signal so as to form a composite video signal therefrom, said means for selectively switching normally supplying said real moving picture video signal to said output terminal and switching over to an output from said memory means when said key signal corresponds to sensing of a drop-out by said drop-out detecting means; and
an output terminal to which said composite video signal is supplied.

* * * * *